United States Patent [19]

Cerroni

[11] 4,215,201
[45] Jul. 29, 1980

[54] PLANT FOR TRANSFORMING TOWN SOLID WASTE INTO A FERTILIZER

[76] Inventor: Manlio Cerroni, Via Bruxelles 53, Rome, Italy

[21] Appl. No.: 923,772

[22] Filed: Jul. 12, 1978

[30] Foreign Application Priority Data

Jul. 19, 1977 [IT] Italy ................ 50351 A/77

[51] Int. Cl.² ............................................. C12B 1/00
[52] U.S. Cl. ................................... 435/290; 435/289;
435/313; 422/184; 422/233; 422/164; 422/225;
422/111; 422/109; 422/114
[58] Field of Search ................. 71/9, 14, 64 TC;
422/164, 184, 225, 224, 232, 233, 109, 111, 114;
241/283, DIG. 38; 195/143; 435/290, 289, 313

[56] References Cited

U.S. PATENT DOCUMENTS

| 3,364,007 | 1/1968 | Redman | 71/9 |
|---|---|---|---|
| 3,438,740 | 4/1969 | Brown | 71/9 |
| 3,856,276 | 12/1974 | Purrel | 422/224 |
| 4,079,837 | 3/1978 | Grube et al. | 71/64 TC |
| 4,104,048 | 8/1978 | Urbanczyk | 71/9 |
| 4,139,640 | 2/1979 | Kipp, Jr. | 71/9 |

FOREIGN PATENT DOCUMENTS

| 496547 | 11/1938 | United Kingdom | 422/224 |
|---|---|---|---|
| 521894 | 6/1940 | United Kingdom | 71/9 |

*Primary Examiner*—Joseph Scovronek
*Assistant Examiner*—Chris Konkol
*Attorney, Agent, or Firm*—Laurence R. Brown

[57] ABSTRACT

A plant for transforming organic substances, contained in town solid waste, into a fertilizer or compost, characterized by the fact that the plant is substantially composed of a basin which is provided with a supporting plane, of a reel which is provided with a rotary motion about its own axis and of a translation motion along the previously mentioned plane, of charging and discharging means for the material to be treated and for the treated material.

8 Claims, 1 Drawing Figure

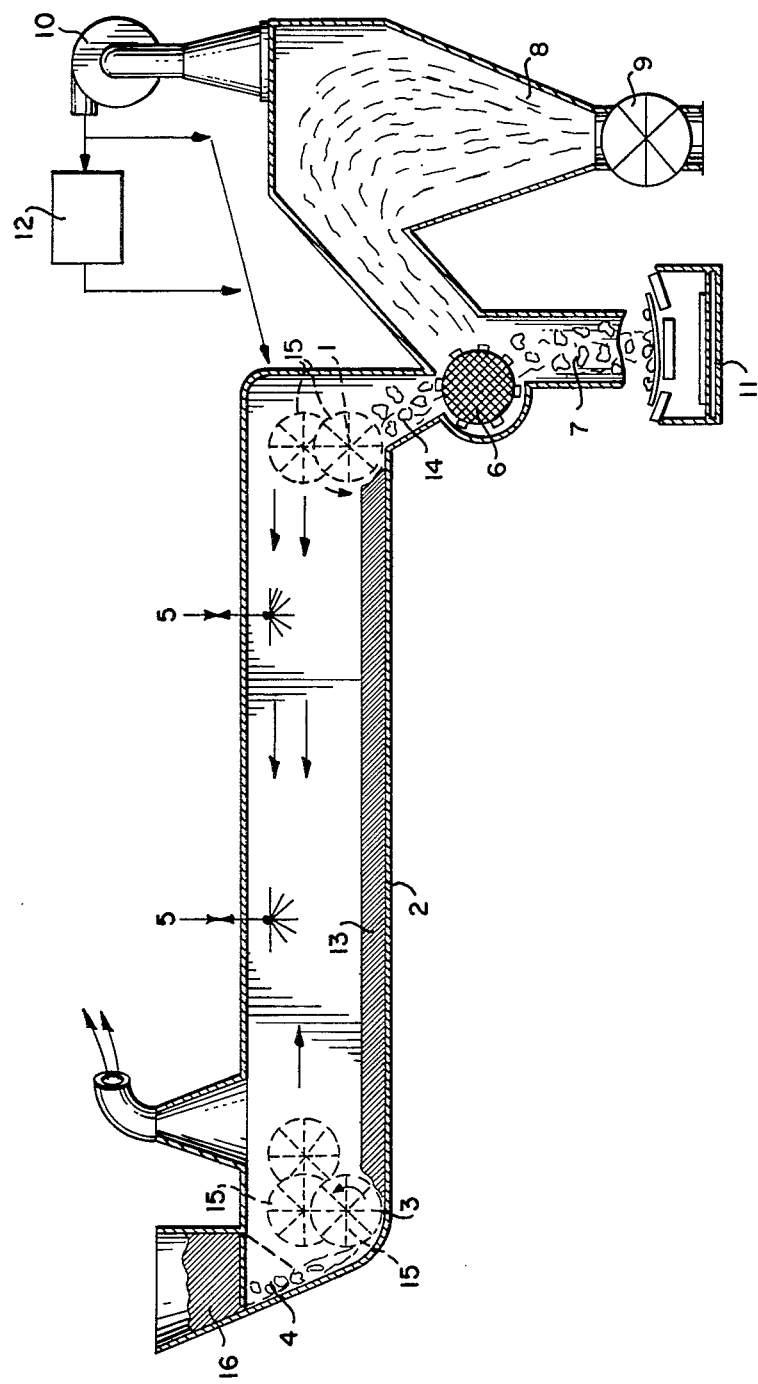

PLANT FOR TRANSFORMING TOWN SOLID WASTE INTO A FERTILIZER

It is known that urban solid waste contains, in more or less remarkable amounts, organic substances and, in particular, vegetal substances which, if suitably treated, can be utilized as a fertilizer, a material which in the market is also known by the name of "compost". Practically, the organic material which is derived from the waste must undergo a fermentation, which may be of a natural or of an accelerated type.

Natural fermentation takes place by laying the material on the ground and letting the fermentation process to occur in a spontaneous way. Such a process is, however, of a very long duration and requires the employment of rather large areas.

Accelerated fermentation, on the contrary, is obtained by feeding with the material special dynamic or static machines, which are called "digesters".

The market offers several types of digesters which range from the rotating drum types to scraping plane types and to static ones.

Within these machines, the fermentation process is accelerated through the blowing into of air and sometimes, also of water which is optionally associated to chemicals.

Many are, however, the drawbacks presented by known digesters, and above all a difficulty arises, that is that they don't allow for an easy control of the material along the various steps of the process.

Another, among the drawbacks presented by the known digesters provided with an easier control facility, is the rather reduced capacity of the machine, this feature being often associated with an elevated cost.

An object of the present invention is a plant for transforming, into a fertilizer or compost, organic materials which are contained in the urban solid waste, in which an accelerated fermentation takes place. Such an accelerated fermentation is, in particular, obtained, by arranging the material to be treated within digesters which are suitably equipped, and in more or less thin layers.

Another object of the present invention is represented by the mechanism through which an agitation is effected and, above all, an overturning of the material within the digester, this material, however, remaining in a plane.

Another object of the present invention is represented by the means which are used in order to achieve the constant and/or irregular control of the material which is being treated at the various points in the digester, to the end of permitting intervention apted to correct and/or accelerate the ambient conditions in which the treatment takes place, and, in particular, to the end of correcting quickly and simply the parameters affecting the fermentation.

According to the invention, the plant is substantially constituted by a basin of a suitable size, wherein the material to be treated is arranged in a more or less thin layer. At both ends of the basin and across its whole width two hoppers are foreseen: a charging hopper and a discharging hopper, both of the automatically controlled type. The material which is arranged into the plane of the basin is agitated and, above all, turned over by means of an equipment which is substantially formed by a reel provided with a rotatory motion about its own axis and with a translation motion toward the charging mouth, the rotation and translation speeds being pre-set. The combination of the rotation motion and the translation motion of the reel give rise, as said, to a feed or advance motion of the material along the plane of the basin and to its over turning, in such a way to facilitate the exposition to the air, and, therefore, to the oxygen of the whole mass, thus accelerating the biological process.

The invention will be better understood by the following description with reference to the enclosed drawing, wherein a plant according to the invention is shown in a purely schematical and illustrative way.

With reference to said drawing, onto the bottom 2 of a suitable basin, a layer of material 13 is arranged this layer having a previously established thickness.

The basin is provided with a discharging mouth 14.

At the discharging mouth 14, and precisely at the position which is indicated by 1 in the drawing, a body 15 is foreseen, this body being provided with vanes in the fashion of a reel or swift, which covers the whole width of the basin 2. The reel 15 is provided with a rotatory motion according to the direction indicated by the arrow, and during this motion, its vanes come into contact with the bottom 2 of the basin and displace the material rearwards, that is in the direction of the discharging mouth 14. In the same time, the reel 15 is provided with a motion of translation, in the direction of the arrow, along the bed of material, and, due to the effect of these translation and rotation motions which are combined together, an over turning of the material in treatment is achieved along the whole period of displacement of the reel 15 from the position indicated by 1 in the drawing to the position indicated by 3. During this displacement, as it is apparent, the material 13 is pushed towards the discharging mouth 14 and is, in the same time, over turned and agitated, in such a way to favour in an increasing measure the exposition to the air, and, therefore, to the oxygen, for the whole mass. When the reel has reached the position 3, the reel itself is raised and displaced above the bed of the material in treatment, and is brought again, without rotation, to the position 1, effecting a kind of movement which is similar to that of an automatic machine tool, which is called "square cycle". When it reaches the position 1, the reel 15 is lowered again in such way that it comes in contact, with its vanes, with the bottom 2, and the previously described cycle is repeated.

When the reel, once the position 3 has been reached, is raised, a space or room remains in the material, owing to the fact that, as a consequence of the rotation of the reel 15 about itself the materials has been accumulated and pushed towards the position 1. At that point, a suitable valve 4 opens and lets automatically an amount of material, coming from charging hopper 16, to be discharged, this amount being equal to the amount which has been displaced through the discharging mouth 14.

It can be, therefore, said that by means of the described plant a process of displacement and turning over of the material is provided which accelerates remarkably the aeration of the material itself and, therefore, its fermentation.

An important feature of the invention is represented also by the fact that it is possible to control periodically or at irregular intervals of time, and at the most various points of the bed, the conditions in which the material 13 finds itself and, through valves 5 for instance, it is possible to introduce into the basin water, chemicals and similar, these products having the function of regulating or controlling the various parameters which determine the velocity of fermentation, as temperature, degree of moisture, pH, and so on, apart, of course, from the water which is introduced through another path.

As previously said, the material 13, due to the effect of the combined rotation and translation of reel 15, is pushed towards the delivery mouth 14. The plant is, therefore, completed by a feeding roller 6 which covers the whole width of the digester 1, which, through rotation, causes the material removed from the reel 15 to reach gradually a channel under vacuum 7 and, from here is decantation chamber 8 which is provided with a star valve 9. When entering the vacuum channel 7, the heavy portion of the material, still dragged by the thus obtained compost, and formed by instance of glass, stones, and so on, falls upon a conveyor belt 11 and is removed, whereas the compost, recovered through the decantation chamber 8, falls into the star valve 9, wherefrom it is transferred to the successive place of destination. An electric exhaust fan 10, provides the needed depression within the channel 7, and the decantation chamber 8, and, since the air sucked by it has still a temperature exceeding the ambient temperature, due to the temperature of the compost, which, owing to natural fermentation phenomens, is high, this air can be utilized again, by sending it to the digester in order to recover the calories which are still present in the air itself. A thermal exchange battery 12, situated between the exhaust fan and the digester, will intervene only when it will be necessary to further increase the temperature inside the basin 2.

It is to be observed, furthermore that the rotation of the reel 15, together with its translation, causes inside the digester a disintegration of the material itself, along the fermentation process, becomes brittler and more fragile, so that the rotation of the reel and, therefore, the successive shocks which are imparted to the material, cause a crushing of the material under treatment and, therefore, a crumbling and mincing of the material itself, which is particularly important to the end of getting the final separation through the aid of a pneumatic system of the type which has been described.

If the disposal speed of the material, already treated and removed through the discharging mouth 14 from the feeding roller 6, is such to allow, in turn, the pneumatic separating plant to work continuously, it is possible to obtain the transformation of a pulsating production of compost by part of the digester, into a continuous production (delivery) of the separator through the star valve 9.

It is obvious that the portion relating to the separation by air can be eliminated, and the separation can be obtained by other means, in which case the feeding of air having a present or regulated temperature will take place through a suitable thermal exchange battery or a similar suitable device.

The plant according to the invention has been described and illustrated only by way of a non-limitative example. Obviously, it may be subjected to those constructive modifications which can be suggested by the technics or by reason of practical realization, without, however, exceeding the scope of the invention itself.

Thus, for instance, the digesters according to the invention may be arranged on parallel planes, and the charging and discharging of the material may take place from the upper plane 2 to the lower plane 2, always a single mouth for charging the material and a single mouth for discharging the material being foreseen, unless there is need to act differently. Naturally, a number of series-connected digester may then be connected in parallel each other, to the end of increasing the capacity of delivery of the plant, taking into account that one of the basic features is the fact that the material under treatment is arranged on a plane and according to one or more or less thin thickness.

I claim:

1. A plant for transforming organic substances, contained in town solid waste, into a fertilizer or compost comprising in combination, a basin which is provided with a supporting plane along which said waste is disposed, a container about the basin retaining a confined atmosphere above ambient temperature accelerating fermentation of said waste, a reel driven along said plane with a continuous rotary motion about its own axis and a translation motion along the previously mentioned plane and having vanes which contact, crush, mince, crumble, and displace the waste along said plane in the single direction of travel of waste along said plane, charging means for entering onto said plane the material to be treated replacing material discharged after treatment, and discharging means for removing from the plane the treated material including means separating fermented compost from contaminating agents.

2. A plant according to claim 1, wherein the reel with a rotary and with a translation motion is driven, once it has reached the end of the translation process along said supporting plane in contact with said waste, to raise and come back in another translation cycle without rotating and without coming into contact with the material to be treated, thus following a so-called "square cycle".

3. A plant according to claim 1 wherein the reel operates during its translation movement by the effect of the rotary motion of its vanes to cause a displacement along the plane toward the discharging means and an overturning of the material with which the vanes come into contact, so favoring the aeration of the material itself and, therefore, its fermentation.

4. A plant according to claim 1 including means for sensing the conditions of the material and means responsive thereto for controlling parameters of fermentation in the atmosphere of said container in response to the surveyed conditions of temperature, moisture, and pH by the introduction of cold or hot air, water and chemicals supplied through pipes located at stations along said plane.

5. A plant according to claim 1, wherein the discharging means delivers the material, which has been translated along said plane due to the effect of the rotation and translation motion of said wheel, to a separating device of a pneumatic type, which effects by pneumatic action the separation of contaminating agents from the discharged material.

6. A plant according to claim 2, wherein the reel displaces waste on said plane when the reel has reached the end-of-stroke position to produce a space devoid of the waste material to be treated in the bed of material, and means filling this space through a valve which is automatically controlled through a charging hopper in response to movement of said reel.

7. A plant as defined in claim 6 having a charging hopper supplying said valve with materials for entry in batches which are cyclically moved along said plane, crushed and aerated by said continuously rotatable reel toward said separator.

8. A plant as defined in claim 5 wherein the pneumatic separating device includes a blower returning warm air from the fermentation process to said container.

* * * * *